United States Patent
Dowaki et al.

(10) Patent No.: US 8,988,572 B2
(45) Date of Patent: Mar. 24, 2015

(54) RADIATION IMAGING APPARATUS INCLUDING RADIATION DETECTION UNIT HAVING A PLURALITY OF PHOTOELECTRIC CONVERSION UNITS, AND CONTROL METHOD THEREFOR

(75) Inventors: Kanako Dowaki, Tokyo (JP); Kazumasa Matsumoto, Yokohama (JP); Hidehiko Saito, Saitama (JP); Takashi Yamazaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/237,734

(22) Filed: Sep. 20, 2011

(65) Prior Publication Data

US 2012/0075515 A1  Mar. 29, 2012

(30) Foreign Application Priority Data

Sep. 28, 2010  (JP) ................. 2010-217454

(51) Int. Cl.
*H04N 5/335* (2011.01)
*H04N 5/217* (2011.01)
*H04N 5/3745* (2011.01)
*H04N 5/347* (2011.01)
*H04N 5/361* (2011.01)

(52) U.S. Cl.
CPC ........... *H04N 5/37452* (2013.01); *H04N 5/347* (2013.01); *H04N 5/361* (2013.01); *H04N 5/37457* (2013.01)
USPC .......................................... 348/308; 348/241

(58) Field of Classification Search
CPC .................................................... H04N 5/335
USPC ................... 348/308, 241, 248, 243; 257/292
See application file for complete search history.

(56) References Cited

U.S. PATENT DOCUMENTS

| | | | |
|---|---|---|---|
| 6,930,716 B2* | 8/2005 | Yoshida | 348/322 |
| 2004/0233311 A1* | 11/2004 | Throngnumchai | 348/308 |
| 2005/0018065 A1* | 1/2005 | Tashiro et al. | 348/308 |

(Continued)

FOREIGN PATENT DOCUMENTS

| | | |
|---|---|---|
| JP | 2001111020 A | 4/2001 |
| JP | 2002-344809 A | 11/2002 |

(Continued)

OTHER PUBLICATIONS

Notification of Reason for Refusal;Reference No. 0091055-01;Dispatch Date: Feb. 18, 2014;Patent Application No. 2010-217454;JPO Examiner Takashi Matsunaga 4228 5V00.

*Primary Examiner* — Nhan T Tran
*Assistant Examiner* — Chan Nguyen
(74) *Attorney, Agent, or Firm* — Canon USA Inc. IP Division

(57) ABSTRACT

A radiation imaging apparatus includes: a radiation detection unit in which a plurality of photoelectric conversion units to convert radiation signals into charge signals and store the charge signals is located; a storage control unit configured to control the storage of the charge signals executed by the plurality of photoelectric conversion units; a reading control unit configured to control reading of the charge signals stored by the plurality of photoelectric conversion units; and a control unit configured to fix an indefinite potential generated at the radiation detection unit while at least one of the storage control of the charge signals by the storage control unit and the reading control of the charge signals by the reading control unit is not carried out.

17 Claims, 7 Drawing Sheets

(56) References Cited

U.S. PATENT DOCUMENTS

| | | | |
|---|---|---|---|
| 2005/0259172 A1* | 11/2005 | Okawa | 348/333.12 |
| 2006/0279650 A1* | 12/2006 | Watanabe et al. | 348/308 |
| 2007/0131991 A1* | 6/2007 | Sugawa | 257/292 |
| 2008/0218620 A1* | 9/2008 | Atlas et al. | 348/308 |
| 2009/0103827 A1* | 4/2009 | Ladd et al. | 382/260 |
| 2010/0141790 A1* | 6/2010 | Hashimoto et al. | 348/222.1 |
| 2010/0141812 A1* | 6/2010 | Hirota | 348/279 |
| 2010/0231771 A1* | 9/2010 | Yaghmai | 348/308 |
| 2011/0102644 A1* | 5/2011 | Posamentier | 348/241 |

FOREIGN PATENT DOCUMENTS

| | | | |
|---|---|---|---|
| JP | 2003-329777 | * | 11/2003 |
| JP | 2003329777 A | | 11/2003 |
| JP | 2006198416 A | | 8/2006 |
| JP | 2008252074 A | | 10/2008 |

* cited by examiner

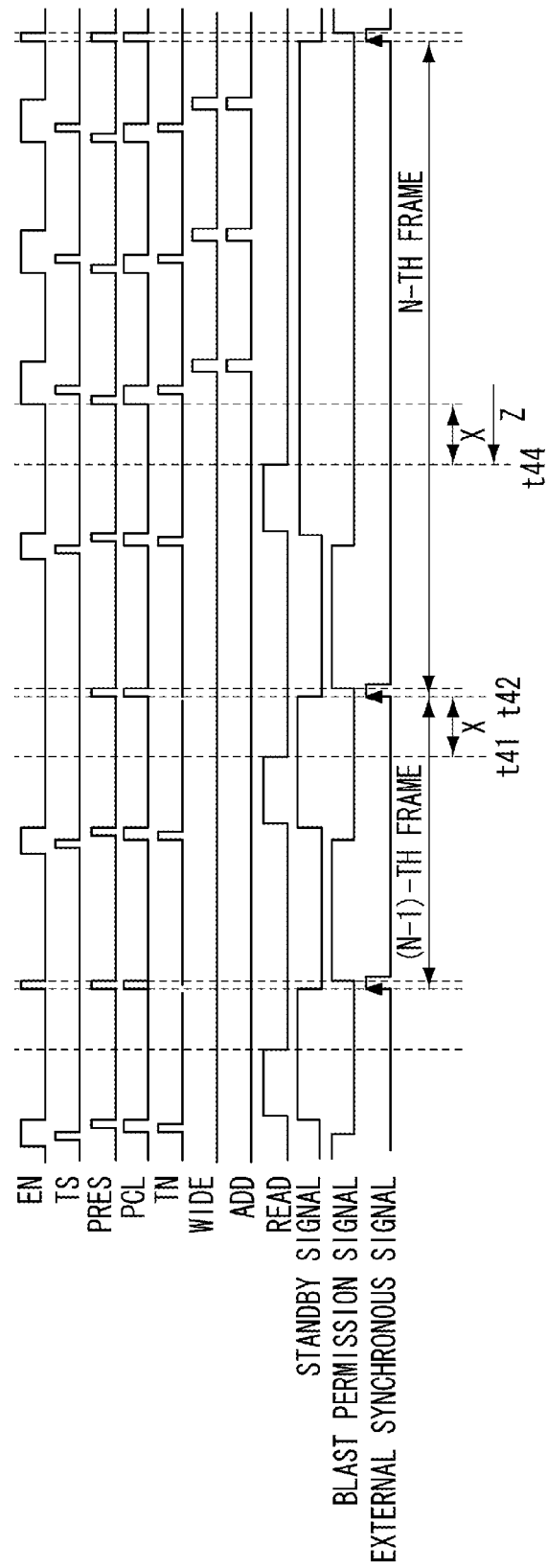

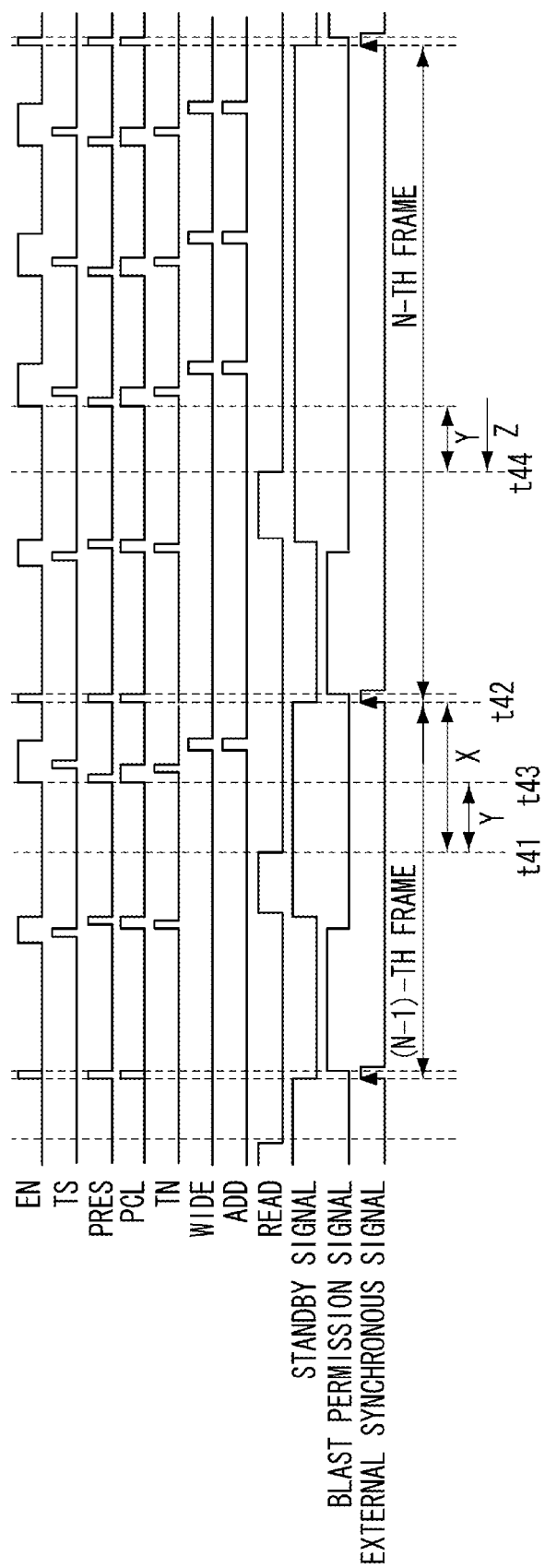

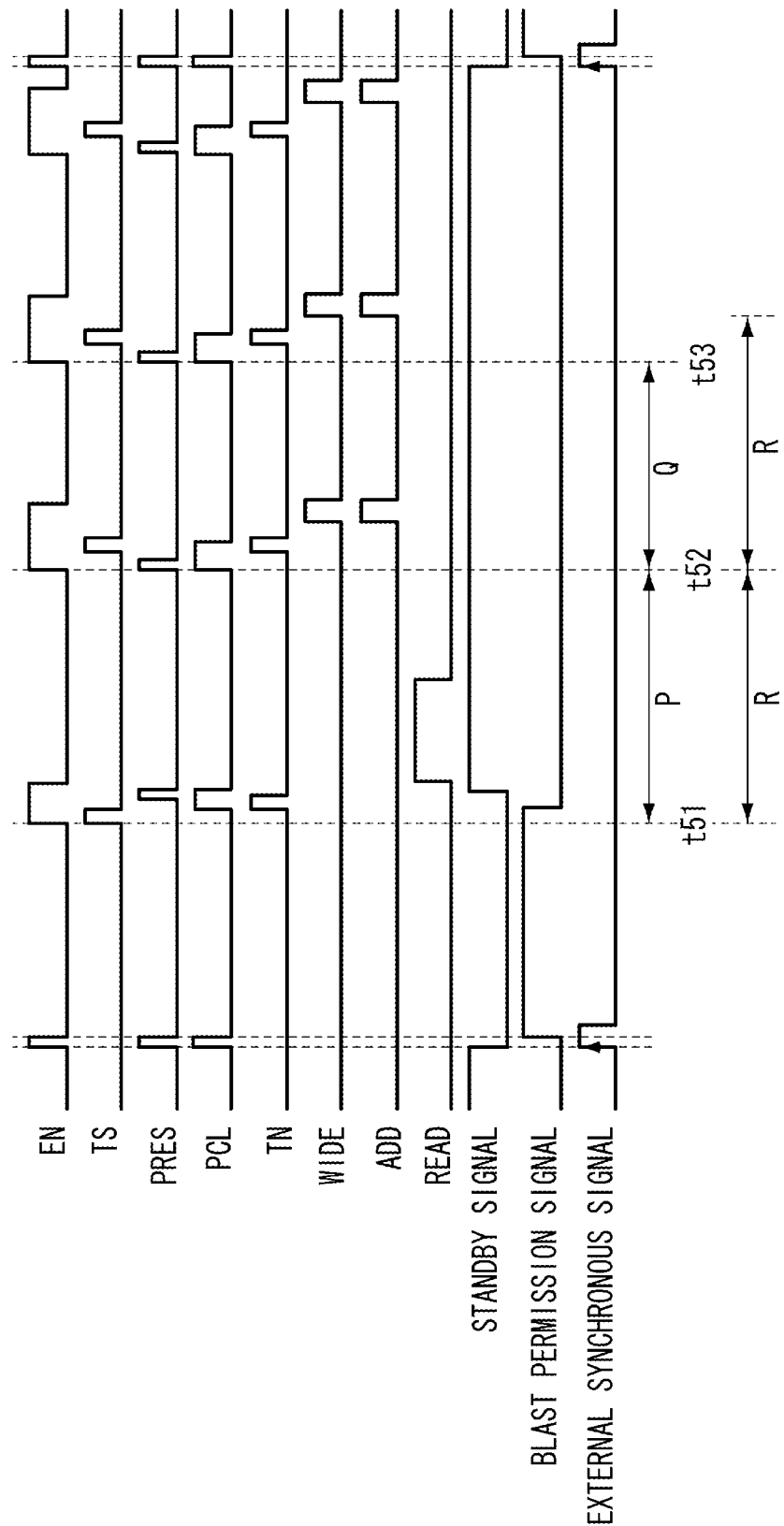

RADIATION IMAGING APPARATUS INCLUDING RADIATION DETECTION UNIT HAVING A PLURALITY OF PHOTOELECTRIC CONVERSION UNITS, AND CONTROL METHOD THEREFOR

BACKGROUND OF THE INVENTION

1. Field of the Invention

The present invention relates to a technology for fixing an indefinite potential generated at a radiation detection unit in which a plurality of photoelectric conversion units for converting radiation signals into charge signals is located.

2. Description of the Related Art

In recent years, in the field of a digital radiation imaging apparatus, there has been popularized a large-area flat panel type sensor of a same size optical system that uses, in place of an image intensifier, a photoelectric conversion unit to improve resolution, reduce a volume, and suppress distortion of an image. Imaging apparatuses using photoelectric conversion units include an amorphous silicon type, a charge-coupled device (CCD) type, and a complementary metal-oxide semiconductor (CMOS) type.

In the case of an image sensor that uses an amorphous silicon semiconductor on a glass substrate, a large-screen type can be easily manufactured. However, semiconductor characteristics are not sufficient for a high-speed operation. Microfabrication of an amorphous silicon semiconductor substrate on the glass substrate is more difficult than a single-crystal silicon semiconductor substrate. As a result, a capacity of an output signal line becomes large, generating kTC noise.

The CCD imaging apparatus is not suited to achievement of a large screen while it is a complete depletion type and high in sensitivity. An area of the CCD becomes large because it is a charge transfer type. When the number of charge transfer stages increases, driving voltages are different between a drive end and the vicinity of a center, causing a difficulty of complete transfer. For power consumption $CVf^2$ (C: capacity between substrate and well, V: pulse amplitude, and f: pulse frequency), C and V are larger as an area is larger, and power consumption is ten times as large as that of a CMOS image sensor.

Japanese Patent Application Laid-Open No. 2002-344809 discusses a large-screen flat panel type sensor where a CMOS image sensor is used for a photoelectric conversion unit, and a large area is achieved by tiling a rectangular image sensor formed by cutting out a CMOS photoelectric conversion unit from a silicon semiconductor wafer into a rectangular shape. Microfabrication of the CMOS image sensor enables reading faster than the amorphous silicon and acquisition of higher sensitivity. A large area can be easily achieved without any problems in number of charge transfer stages or power consumption of the CCD image sensor. Thus, it is known that the CMOS image sensor is advantageous for the large-screen flat panel type sensor particularly as a moving image imaging apparatus.

However, in the CMOS image sensor that simultaneously achieves pixel addition and sensitivity switching, when driven in a high-sensitivity mode, an indefinite potential is generated in a circuit of the CMOS image sensor. During moving image capturing, when there is an indefinite potential in the circuit of the CMOS image sensor, a minute amount of leakage becomes indefinite between a gate and a source of a metal-oxide semiconductor (MOS) transistor in the circuit of the CMOS image sensor, affecting the operation as random noise of each frame.

In the CMOS image sensor, dark current is generated during a period where it is not irradiated with light for capturing. Thus, the CMOS image sensor has an offset value, and each pixel outputs a value that is not zero as a optical signal even when the CMOS image sensor is not irradiated with light. There is a method for setting optical signal data acquired without being irradiated with light as a fixed pattern noise (FPN) pattern, and subtracting the FPN pattern from the optical signal data acquired during capturing of the moving image. However, a potential at a floating portion for each moving image capturing changes with time. Hence, there is a difference between a potential at a floating portion in the CMOS image sensor, which is acquired before the FPN pattern is captured, and a potential at a floating portion when a moving image is actually captured. This causes a difference in noise components generated due to the indefinite potential at the floating portion between the FPN pattern and moving image data for FPN correction. As a result, correct FPN correction cannot be carried out.

SUMMARY OF THE INVENTION

The present invention is directed to reducing noise components and performing accurate FPN correction.

According to an aspect of the present invention, a radiation imaging apparatus includes: a radiation detection unit that includes a plurality of photoelectric conversion units to convert radiation signals into charge signals and store the charge signals; a storage control unit configured to control the storage of the charge signals executed by the plurality of photoelectric conversion units; a reading control unit configured to control reading of the charge signals stored by the plurality of photoelectric conversion units; and a control unit configured to fix an indefinite potential generated at the radiation detection unit while at least one of the storage control of the charge signals by the storage control unit and the reading control of the charge signals by the reading control unit is not carried out.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 5A and 5B are timing charts each illustrating a driving method of a CMOS image sensor during moving image capturing according to a second exemplary embodiment of the present invention.

FIG. 6 is a timing chart illustrating a driving method of a CMOS image sensor during moving image capturing according to a third exemplary embodiment of the present invention.

DESCRIPTION OF THE EMBODIMENTS

Figure 1:
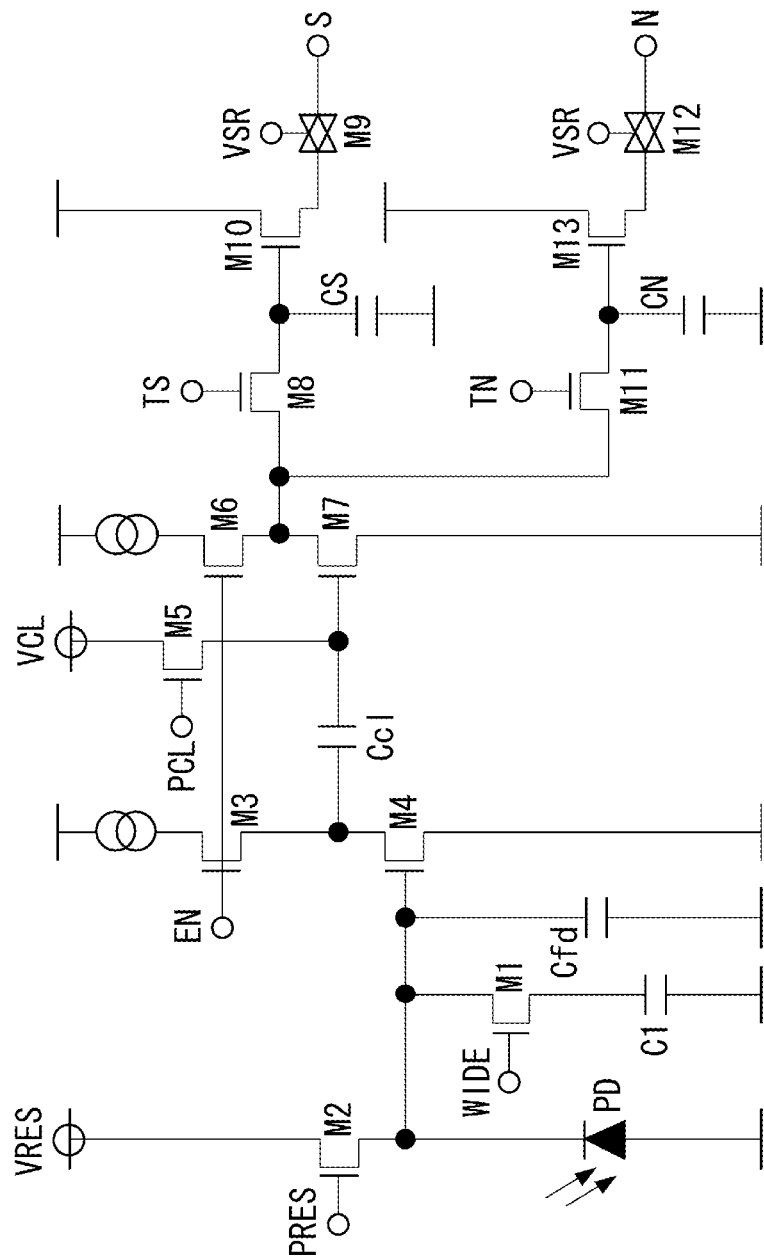
FIG. 1 illustrates an example of a pixel circuit of one pixel of a CMOS image sensor applied to a radiation imaging apparatus according to an exemplary embodiment of the present invention.

Various exemplary embodiments, features, and aspects of the invention will be described in detail below with reference to the drawings. First, a first exemplary embodiment of the present invention is described. FIG. 1 illustrates an example of a pixel circuit (radiation detection circuit) of one pixel of a CMOS image sensor applied to a radiation imaging apparatus according to the first exemplary embodiment of the present invention. In an actual radiation imaging apparatus, a plurality of pixel circuits similar to those illustrated in FIG. 1 is two-dimensionally arranged.

In FIG. 1, the pixel circuit includes a photodiode (PD) (photoelectric conversion unit) configured to convert a radiation signal into a charge signal, a reset MOS transistor M2 (resetting switch) configured to discharge charge signals stored in floating diffusion (floating diffusion area) in which the charge signals are accumulated in a capacity Cfd, and a sensitivity switching MOS transistor M1 (sensitivity changing switch) configured to switch a high dynamic range mode and a high sensitivity mode. A capacity C1 can be used for expanding a dynamic range, and the charge signals can be stored when the sensitivity changing switch (M1) is turned on. The turning-on of the sensitivity changing switch (M1) substantially increases a capacity of a floating node portion to lower sensitivity. However, the dynamic range can be expanded. Thus, for example, the sensitivity changing switch (M1) is turned off during X-ray radioscopic imaging that needs high sensitivity, and turned on during digital subtraction angiography (DSA) photographing that needs a high dynamic range.

The pixel circuit includes an amplification MOS transistor M4 (pixel amplifier 1) that operates as a source follower, a selection MOS transistor M3 (selection switch 1) configured to set the pixel amplifier 1 (M4) operative, a clamp circuit having a capacity Cc1, which is located at a rear stage of the pixel amplifier 1 (M4) to remove kTC noise generated at a photoelectric conversion unit, a clamp MOS transistor M5 (clamp switch), an amplification MOS transistor M7 (pixel amplifier 2) that operates as a source follower, and a selection MOS transistor M6 (selection switch 2) configured to set the pixel amplifier 2 (M7) operative. Two sample and hold circuits are located at a rear stage of the pixel amplifier 2 (M7).

The pixel circuit includes a sample and hold MOS transistor M8 (sample and hold circuit S) that constitutes a sample and hold circuit to store signals, having a signal holding capacity CS, a sample holding MOS transistor M11 (sample and hold switch N) that constitutes a sample and hold circuit to store noise signals, having a noise signal holding capacity CN, an amplification MOS transistor M10 (pixel amplifier S) that operates as a source follower, an analog switch M9 (transfer switch S) configured to output a signal amplified by the pixel amplifier S (M10) to an S signal output line, a noise signal amplification MOS transistor M13 (pixel amplifier N) that operates as a source follower, and an analog switch (M12) configured to output a noise signal amplified by the pixel amplifier N (M13) to an N signal output line.

An EN signal is a control signal connected to gates of the selection switch 1 (M3) and the selection switch 2 (M6) to set the pixel amplifier 1 (M4) and the pixel amplifier 2 (M7) operative. When the EN signal is at a high level, the pixel amplifier 1 (M4) and the pixel amplifier 2 (M7) simultaneously become operative. A WIDE signal is connected to a gate of the sensitivity changing switch (M1) to control sensitivity switching. When the WIDE signal is at a low level, the sensitivity changing switch is turned off to set the high sensitivity mode. When the WIDE signal is at a high level, the sensitivity changing switch is turned on to set the high dynamic range mode. This mode switching control is a processing example of a photographing mode control unit.

A PRES signal is a reset signal for turning the resetting switch (M2) on to discharge the charge signals stored in the photodiode PD. A PCL signal is for controlling the clamp switch (M5). When the PCL signal is at a high level, the clamp switch (M5) is turned on to set the clamp capacity (Cc1) to a reference voltage VCL. A TS signal is an optical signal sample and hold control signal. The TS signal is set high, and the sample holding switch S (M8) is turned on, thereby transferring the charge signals en bloc through the pixel amplifier 2 (M7) to the capacity CS. Then, the TS signal is set low for all pixels en bloc, and the sample holding switch S (M8) is turned off, thereby ending holding of the charge signals in the sample and hold circuit. A TN signal is a noise signal sample and hold control signal. The TN signal is set high, and the sample holding switch N (M11) is turned on, thereby transferring noise signals en bloc through the pixel amplifier 2 (M7) to the capacity CN. Then, the TN signal is set low for all the pixels en bloc, and the sample and hold switch N (M11) is turned off, thereby ending holding of the noise signals in the sample and hold circuit. This holding control of the noise signals in the sample and hold circuit is a processing example of a sample holding control unit.

Figure 2A:
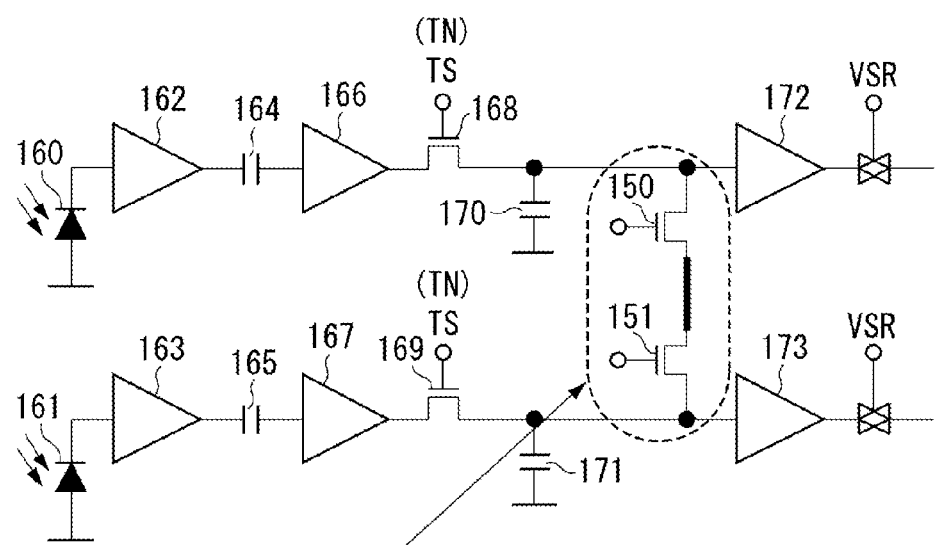
FIGS. 2A and 2B each illustrates a circuit configuration when a pixel addition circuit is inserted into the pixel circuit illustrated in FIG. 1.
Figure 2B:
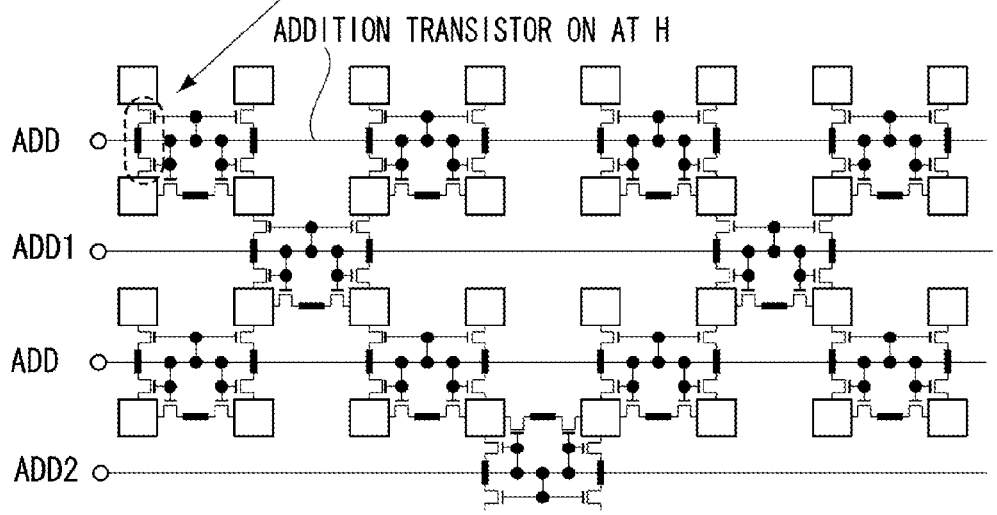

FIGS. 2A and 2B each illustrates a circuit configuration when a pixel addition circuit is inserted into the pixel circuit illustrated in FIG. 1. FIG. 2A illustrates the configuration when the pixel addition circuits are inserted into two simplified circuits each of which corresponds to the pixel circuit illustrated in FIG. 1. Photodiodes 160 and 161 of the respective circuits correspond to the photodiode (PD) illustrated in FIG. 1. Amplification MOS transistors (pixel amplifiers) 162, 163, 166, 167, 172, and 173 operate as source followers of the respective circuits: 162 and 163 corresponding to the pixel amplifier 1 (M4) illustrated in FIG. 1, 166 and 167 corresponding to the pixel amplifier 2 (M7) illustrated in FIG. 1, and 172 and 173 corresponding to the pixel amplifier S (M10) or the pixel amplifier N (M13) illustrated in FIG. 1. Clamp capacities 164 and 165 of the respective circuits correspond to the clamp capacity (Cc1) illustrated in FIG. 1. Sample MOS transistors (sample switch) 168 and 169 constitute signal or noise signal storage sample and hold circuits of the respective circuits: 168 and 169 corresponding to the sample and hold switch S (M8) or the sample and hold switch N (M11) illustrated in FIG. 1. Signal or noise signal holding capacities 170 and 171 correspond to the signal holding capacity (CS) or the noise signal holding capacity (CN) illustrated in FIG. 1. Addition MOS transistors (addition switches) 150 and 151 constitute the pixel addition circuits.

FIG. 2B illustrates a state where a pixel addition circuit for electrically adding pixel circuits having PDs located adjacent to each other is inserted between the pixel circuits, " " indicating a pixel circuit of one pixel of the CMOS imaging apparatus. A portion surrounded with a dotted line illustrated in FIG. 2A and a portion surrounded with a dotted line illustrated in FIG. 2B indicate the same circuit portion.

As shown in FIG. 2B, the pixel addition circuit connects the signal or noise signal holding capacity of each of the adjacent pixel circuits to add pixels. This reduces pixels to be scanned without discarding pixel information, enabling signal reading at a faster frame rate. In FIG. 2B, when a signal ADD is set high while a signal ADD 1 is set low, pixel addition of 2×2 is carried out. When the signal ADD is set high and the signal ADD 1 is set high, pixel addition of 4×4 is carried out. Further, when a signal ADD 2 is set high, pixel addition of 8×8 (not illustrated) is carried out. Photographing sensitivity can be controlled by using the pixel addition circuit.

Figure 3:
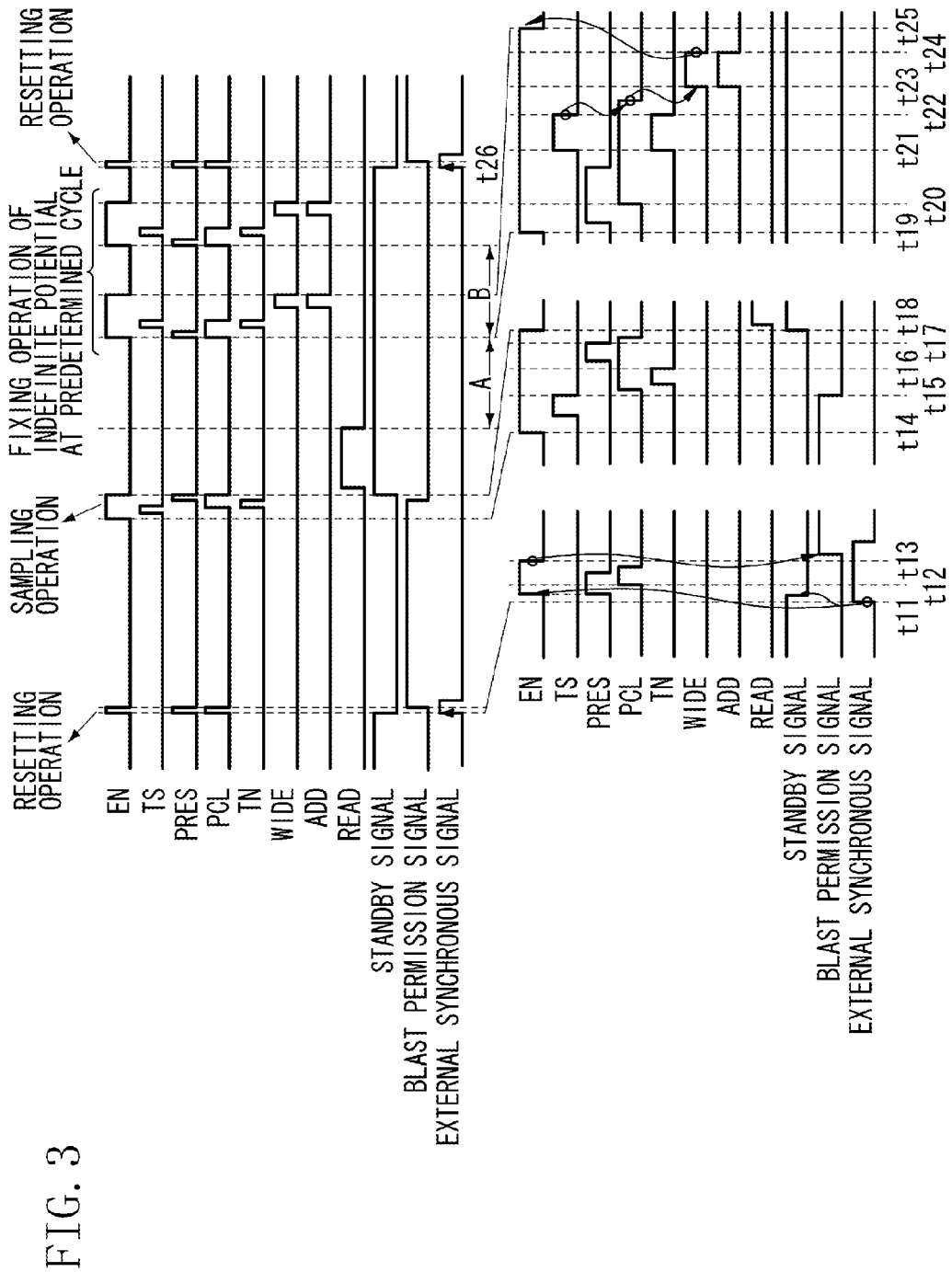
FIG. 3 is a timing chart illustrating a resetting operation, a sampling operation, and an indefinite potential fixing operation according to the first exemplary embodiment of the present invention.

FIG. 3 illustrates three main driving operations, namely, a resetting operation, a sampling operation, and an indefinite potential fixing operation, according to the first exemplary embodiment of the present invention. A driving method of the CMOS image sensor illustrated in FIG. 3 is implemented for all the pixels en bloc. The operations described below are performed by a control unit (not illustrated) included in the radiation imaging apparatus.

First, when power is supplied to the sensor, the EN signal, the TS signal, the PRES signal, the PCL signal, the TN signal, the WIDE signal, and the ADD signal are kept low, while only a standby signal becomes high. The control unit, which has detected an external synchronization signal indicating an instruction of a photographing start, executes a sensor resetting operation to control the EN signal, the PRES signal, and the PCL signal. This sensor resetting operation is a processing example of a reset control unit.

As soon as it detects the external synchronization signal indicating the photographing start at (t11), the control unit sets the standby signal low. The control unit simultaneously sets the EN signal high, thereby setting the pixel amplifier 1 (M4) and the pixel amplifier 2 (M7) operative. The control unit then sets the PRES signal high, and connects the photodiode (PD) to a reference voltage to execute resetting. The control unit sets the PRES signal low to end the resetting. A reference voltage VRES is accordingly set on the pixel amplifier 1 (M4) side of the clamp capacity (Cc1).

At (t12), the control unit sets the signal PCL high to turn the clamp switch (M5) on, thereby setting a reference voltage VCL on the pixel amplifier 2 (M7) side of the clamp capacity (Cc1). The control unit then turns the clamp switch (M5) off to store charges corresponding to a difference voltage between the reference voltage VCL and the reference voltage VRES in the clamp capacity (Cc1), thereby ending the clamping. The control unit ends the resetting operation. From (t13), storage of charge signals is started at the photodiode PD and the photoelectric conversion unit of the floating diffusion capacity (Cfd). In this case, the storage time of the charge signals is constant. This storage control of the charge signals is a processing example of a storage control unit.

After the storage of the charge signals, the control unit controls the EN signal, the TS signal, the PRES signal, the PCL signal, and the TN signal to execute a sampling operation. At (t14), the control unit sets the EN signal high to turn the selection switch 1 (M3) and the selection switch 2 (M6) on. The charge signals stored in the floating diffusion capacity (Cfd) are accordingly subjected to charge-voltage conversion, and output as voltage signals to the clamp capacity (Cc1) by the pixel amplifier 1 (M4) that operates as the source follower. The output of the pixel amplifier 1 (M4) contains reset noise. However, because of the reference voltage VCL set on the pixel amplifier 2 (M7) by the clamp circuit during the resetting, the output becomes a signal from which the reset noise has been removed to be output to the pixel amplifier 2 (M7).

The control unit sets the TS signal high to turn the sample and hold switch S (M8) on, thereby transferring the signals en bloc through the pixel amplifier 2 (M7) to the signal holding capacity (CS). At (t15), the control unit sets the TS signal low to turn the sample and hold switch S (M8) off, thereby sampling and holding the charge signals in the signal holding capacity (CS).

The control unit sets the PCL signal high. The charge signals having reset noise superimposed on the difference voltage between the voltage VCL and the voltage VRES are stored in the clamp capacity (Cc1). After the PCL signal has been set high, the control unit sets the TN signal high to turn the sample and hold switch N (M11) on, thereby transferring a noise signal when the reference voltage VCL is set to the noise signal holding capacity (CN).

At (t16), the control unit sets the TN signal low to turn the sample and hold switch N (M11) off, thereby sampling and holding the noise signal in the noise signal holding capacity (CN). The control unit then sets the PRES signal high to turn the resetting switch (M2) on, thereby resetting the capacity (Cfd) to the reference voltage VRES. At (t17), the control unit sets the PRES signal low to complete the resetting. The control unit sets the PCL signal and the EN signal low to end the sampling operation at (t18).

After the end of sampling, the control unit executes a reading operation of the charge signals. Signal and noise signal scanning is carried out for each pixel. The control unit turns the transfer switch S (M9) and the transfer switch N (M12) on. Thus, the charge signals stored in the signal holding capacity (CS) and the charge signals stored in the noise signal holding capacity (CN) are respectively transferred through the pixel amplifier S (M10) and the pixel amplifier N (M13) to a signal output line and a noise signal output line. The charge signals transferred to the signal output line and the noise signal output line are subtracted by a differential input amplifier (not illustrated) connected to the signal output line and the noise signal output line. This removes FPN caused by heat noise, 1/F noise, a temperature difference or a process variation at the pixel amplifier. A period that permits transfer is from the end of sample and hold at (t15) to sample and hold again of signals and noise signals of a next frame in the signal holding capacity (CS) and the noise signal holding capacity (CN). The reading control of the charge signals is a processing example of a reading control unit.

After the end of sampling, the control unit sets, simultaneously with the reading operation of the charge signals, a standby signal high to stand by until an external synchronization signal (t26) is input. However, the external synchronization signal is recognized only in a standby state.

Figure 4:
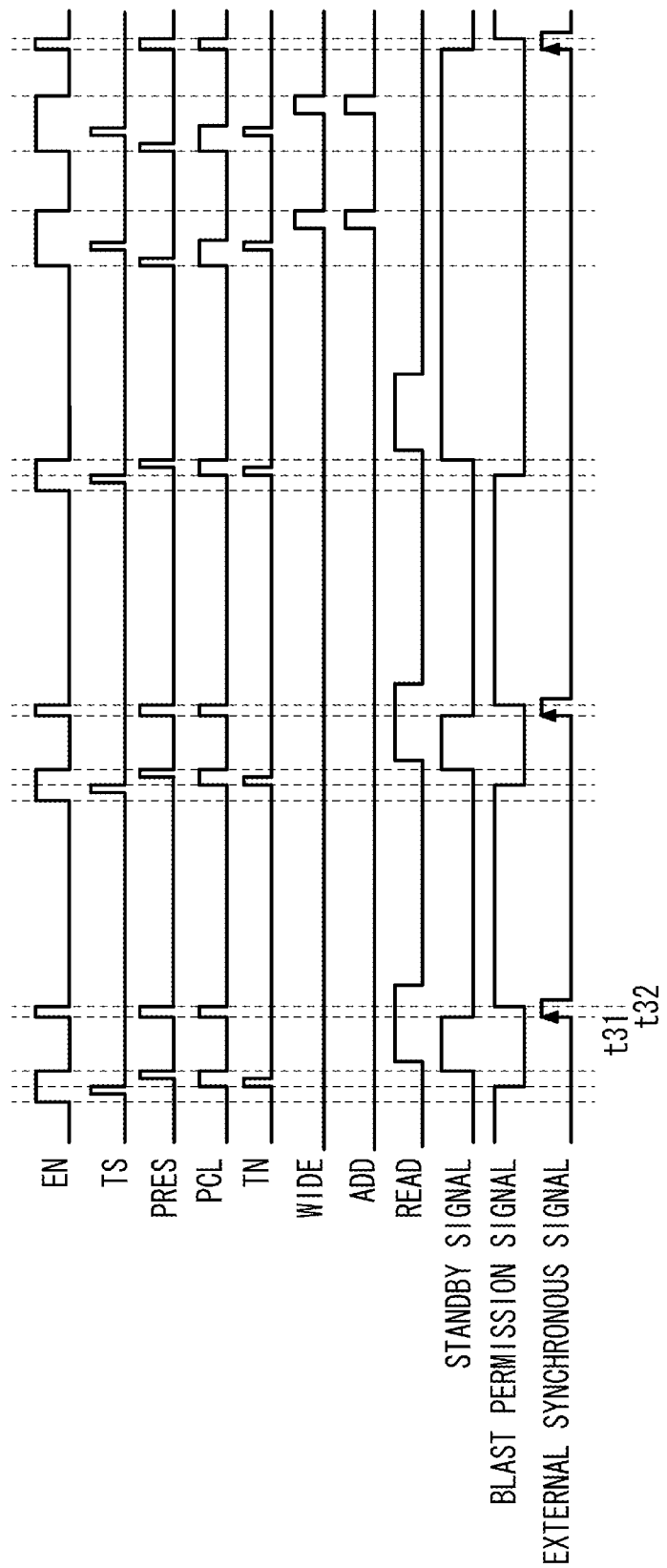
FIG. 4 is a timing chart illustrating an operation when an external synchronization signal is input during charge signal reading according to the first exemplary embodiment of the present invention.

FIG. 4 is a timing chart illustrating an operation when the external synchronization signal is input during the charge signal reading according to the first exemplary embodiment of the present invention. A driving method for the CMOS image sensor illustrated in FIG. 4 is implemented for all the pixels en bloc. Referring to FIG. 4, the operation when the external synchronization signal is input during the charge signal reading is described.

At (t31), when there is input an external synchronization signal even during the charge signal reading, the control unit sets the standby signal low to execute a resetting operation. At (t32), the control unit starts radiation storage of a next frame. The EN signal, the PRES signal, and the PCL signals controlled during the resetting operation all have no relation to sampling. Hence, even when the resetting operation is executed during the charge signal reading, there is no influence on the signal holding capacity (CS) or the noise signal holding capacity (CN). In other words, image data to be output is not affected.

As illustrated in FIG. 3, according to the present exemplary embodiment, when no external synchronization signal is input for a predetermined time (A) after the end of the charge signal reading, the control unit controls the EN signal, the TS signal, the PRES signal, the PCL signal, the TN signal, the WIDE signal, and the ADD signal to cyclically fix indefinite potentials at predetermined intervals (B).

The fixing operation of indefinite potentials includes fixing of indefinite potentials regarding the TS signal, the TN signal, the WIDE signal, and the ADD signal in addition to the resetting operation. First, at (t19), the control unit sets the EN signal high to set the pixel amplifier 1 (M4) and the pixel amplifier 2 (M7) operative. The control unit sets the PRES signal high, and connects the photodiode (PD) to the reference voltage VRES to execute resetting. The control unit then sets the PRES signal low to end the resetting, thereby setting the reference voltage VRES on the pixel amplifier 1 (M4) side of the clamp capacity (Cc1).

At (t20), the control unit sets the PCL signal high to turn the clamping switch (M5) on, thereby setting the reference voltage VCL on the pixel amplifier 2 (M7) side of the clamp capacity (Cc1). At (t21), the control unit sets the TS signal and the TN signal high in an on-state of the clamping switch (M5) to turn the sample holding switches S and N (M8 and M11) on. In the clamp capacity (Cc1), charge signals having reset noise superimposed on a difference voltage between the voltage VCL and the voltage VRES are accordingly stored.

Clamping capacities (Cc1) are transferred en bloc through the pixel amplifier 2 (M7) to the signal holding capacity (CS) and the noise signal holding capacity (CN). At (t22), the control unit sets the TS signal and the TN signal low to turn the sample and hold switches S and N (M8 and M11) off. Thus, the clamp capacities (Cc1) are sampled and held in the signal holding capacity (CS) and the noise signal holding capacity (CN). Then, the control unit sets the PCL signal low.

At (t23), the control unit sets the WIDE signal and the ADD signal high to set a stable potential at the floating portion. At (t24), the control unit sets the WIDE signal and the ADD signal low. At (t25), the control unit sets the EN signal low. Thus, the fixing operation of the indefinite potentials is ended.

The fixing operation of the indefinite potentials is structurally destructive reading. Thus, when the indefinite potentials are fixed, data sampled by photographing is lost. Hence, the fixing operation of the indefinite potentials is executed after completion of storage and reading of the charge signals. In other words, a period that permits transfer of reading signals of the charge signals is from the end of sample and hold at (t16) to sample and hold of the charge signals of the fixing operation of the indefinite potentials in the signal holding capacity (CS) and the noise signal holding capacity (CN) at (t21). When an external synchronization signal is detected during the fixing operation of the indefinite potentials, the control unit stops the fixing operation of the indefinite potentials to start a resetting operation and radiation storage.

There are no restrictions on on-off order or timing of each signals controlled during the resetting operation, the sampling operation, and the fixing operation of the indefinite potentials. Taking the example of the fixing operation of the indefinite potentials, as long as an object of setting stable potentials at all the floating portions is achieved, timing for turning high level or low level in each signal can be changed, a high level can be repeatedly changed to a low level or signals can be ones which do not become high. For example, in FIG. 3, the EN signal, the TS signal, the PRES signal, the PCL signal, and the TN signal can be set to execute operations similar to the sampling operation. This can simplify mounting of driving patterns.

According to the present exemplary embodiment, the fixing operation of the indefinite potentials is automatically started when the predetermined time elapses after the completion of image data reading. However, this is in no way limitative of the present invention. For example, by a command or a button operation, the fixing operation of the indefinite potentials can be started at a predetermined cycle.

According to the present exemplary embodiment, as in the case of no pixel addition at high-sensitivity setting, even when a floating portion is maintained between the capacity (C1) and the addition switch 150 and the addition switch 151 while the sensitivity changing switch (M1), the addition switch 150, and the addition switch 151 are not turned on during photographing, a part of random noise is fixed by fixing potentials between the capacity (C1) and the addition switch 150 and the addition switch 151 at the predetermined cycle. Thus, according to the present exemplary embodiment, because of no difference between the potential of the floating portion in the CMOS image sensor when the FPN pattern is acquired and the potential of the floating portion when a moving image is actually acquired, accurate FPN correction can be carried out.

According to the present exemplary embodiment, even if the indefinite potentials of the floating portion are fixed at the predetermined cycle, a state automatically changes to a photographing start when the external synchronization signal is detected, and hence external synchronization photographing where a frame rate changes can be dealt with. The sampling is carried out immediately after the storage end of the charge signals, and hence there is no wasteful operation until preparation of next photographing. After the end of sampling, photographing of a next frame can always be started in the standby state. In other words, photographing can be carried out at a high frame rate without any influence on operation time until an object is irradiated.

Next, a second exemplary embodiment of the present invention is described. FIGS. 5A and 5B are timing charts each illustrating a driving method of a CMOS image sensor during moving image capturing according to the second exemplary embodiment of the present invention. The driving method of the CMOS image sensor illustrated in FIGS. 5A and 5B is implemented for all pixels en bloc. A configuration of a pixel circuit of the CMOS image sensor applied to a radiation imaging apparatus of the present exemplary embodiment is similar to that illustrated in FIG. 1.

Suppose that one frame is from a certain external synchronization signal to rising of a next external synchronization signal. A case where a frame rate drops at an N-th frame from an (N−1)-th frame is illustrated. FIG. 3 illustrates time X from a reading end at the (N−1)-th frame (t41) to an external synchronization signal start of a photographing start at the N-th frame (t42), time Y from the reading end at the (N−1)-th frame (t41) to a first fixing operation start of an indefinite potential at the N-th frame (t43), and time Z measured from a reading end at the N-th frame (t44).

According to the present exemplary embodiment, when no external synchronization signal is detected even with X<Z or Y<Z, a fixing operation of indefinite potentials at a predetermined cycle is started. When an external synchronization signal is input during reading at the (N−1)-th frame, a predetermined value such as X=0 is set. When predetermined fixing operation start time of indefinite potentials (A illustrated in FIG. 3) is shorter than Y, control of the present exemplary embodiment is not executed. In this case, a predetermined value is set for Y. By a command or a button operation, it can be set that no fixing operation of indefinite potentials be started even with X<Z or Y<Z.

Even in a case where the frame rate becomes high at the N-th frame from the (N−1)-th frame, when a status similar to that described above is occurred (when X<Z or Y<Z), similar control is executed. According to the present exemplary embodiment, in the apparatus where the frame rate changes for radiation blast or storage because of the external synchronization signal, even when a change such as a sudden drop of the frame rate occurs, FPN correction can be accurately carried out by fixing the indefinite potentials at a floating portion and suppressing an influence of random noise.

Next, a third exemplary embodiment of the present invention is described. FIG. 6 is a timing chart illustrating a driving method of a CMOS image sensor during moving image capturing according to the third exemplary embodiment of the present invention. The driving method of the CMOS image sensor illustrated in FIG. 6 is implemented for all pixels en bloc. A configuration of a pixel circuit of the CMOS image sensor applied to a radiation imaging apparatus of the present exemplary embodiment is similar to that illustrated in FIG. 1.

The present exemplary embodiment is directed to a method for setting a fixing operation cycle of indefinite potentials. In the first and second exemplary embodiments, the fixing operation cycle of the indefinite potentials is a predetermined cycle (B illustrated in FIG. 3). However, according to the present exemplary embodiment, the predetermined fixing cycle of the indefinite potentials is equal to or less than a shortest cycle where a photoelectric conversion unit stores predetermined noise.

FIG. 6 illustrates an interval P from a start point of a sampling operation (t51) to a starting point of a fixing operation of an indefinite potential (t52), and an interval Q from (t52) to a start point of a next fixing operation of an indefinite potential (t53). Noise stored in the CMOS image sensor is separately measured, and a shortest cycle R where the noise reaches a predetermined value is set. An influence of random noise can surely be suppressed by executing control to set P and Q equal to or less than R.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-217454 filed Sep. 28, 2010, which is hereby incorporated by reference herein in its entirety.

What is claimed is:

1. A radiation imaging apparatus including a radiation detection unit in which a plurality of photoelectric conversion units configured to convert radiation signals into charge signals and store the charge signals is located, the apparatus comprising:
   a storage control unit configured to control the storage of the charge signals executed by the plurality of photoelectric conversion units;
   a reading control unit configured to control reading of the charge signals stored in the plurality of photoelectric conversion units; and
   a control unit configured to perform a process for fixing an indefinite potential generated at the radiation detection unit during a time interval in which at least one of the storage control of the charge signals by the storage control unit and the reading control of the charge signals by the reading control unit is not carried out,
   wherein the radiation imaging apparatus repeatedly performs imaging at a variable frame rate for obtaining multiple frames of a radiation image with the radiation detection unit, and
   wherein the control unit is configured to change a number of the processes performed such that the process of fixing the indefinite potential during the time interval is repeatedly performed in accordance to the frame rate.

2. The radiation imaging apparatus according to claim 1, wherein the control unit fixes the indefinite potential at a predetermined cycle.

3. The radiation imaging apparatus according to claim 1, wherein the control unit comprises at least one of a reset control unit configured to control a resetting operation of the photoelectric conversion unit, a photographing mode control unit configured to control a photographing mode of the photoelectric conversion unit, and a sample and hold control unit configured to control sample and hold of the charge signals stored by the photoelectric conversion unit.

4. The radiation imaging apparatus according to claim 1, wherein when a photographing start is instructed during the fixing of the indefinite potential, the control unit stops the fixing of the indefinite potential, and the storage control unit causes the plurality of photoelectric conversion units to store the charge signals.

5. The radiation imaging apparatus according to claim 3, wherein the reset control unit comprises a clamp unit configured to remove reset noise generated at the reset control unit.

6. The radiation imaging apparatus according to claim 3, wherein the photographing mode control unit comprises a pixel addition unit configured to electrically add a pixel where the photoelectric conversion units are adjacent to each other, and photographing sensitivity is controlled by using the pixel addition unit.

7. The radiation imaging apparatus according to claim 2, wherein the predetermined cycle is equal to or less than a shortest cycle to store predetermined noise in the photoelectric conversion unit.

8. A method for controlling a radiation imaging apparatus including a radiation detection unit in which a plurality of photoelectric conversion units to convert radiation signals into charge signals and store the charge signals is located, the method comprising:
   controlling the storage of the charge signals executed by the plurality of photoelectric conversion units;
   controlling reading of the charge signals stored by the plurality of photoelectric conversion units; and
   executing control to perform a process for fixing an indefinite potential generated at the radiation detection unit while at least one of the storage control of the charge signals and the reading control of the charge signals is not carried out,
   wherein the radiation imaging apparatus repeatedly performs imaging at a variable frame rate for obtaining multiple frames of a radiation image with the radiation detection unit, and
   wherein the control unit is configured to change a number of the processes performed such that the process of fixing the indefinite potential during the time interval is repeatedly performed in accordance to the frame rate.

9. A radiation imaging apparatus for performing radiation imaging for obtaining an image including multiple frames, the radiation imaging apparatus comprising:
   a voltage source for generating a reference voltage;
   a radiation imaging sensor including pixels for obtaining signals corresponding to intensity of radiation detected by the pixels, each of the pixels including:

a photoelectric conversion element for generating and accumulating a charge;

a sample hold circuit coupled to the photoelectric conversion element for holding a signal corresponding to the accumulated charge at the photoelectric conversion element; and a switch element for connecting the voltage source and the sample hold circuit;

the radiation imaging sensor further including at least one signal line coupled to the sample hold circuit for outputting the held signal;

a receiver for receiving an external signal indicating a timing of radiation generation; and a control unit configured to control the radiation imaging sensor to perform accumulation of a charge with the radiation imaging sensor in response to a reception of the external signal, and to perform readout of the held signal from each of the pixels via the signal line, wherein the control unit is configured to perform a process to control the switch element on to store in the sample hold circuit a signal corresponding to the reference voltage repeatedly before the external signal has been received.

10. The radiation imaging apparatus of claim 9, wherein the control unit configured to change the number of the process performed at the period of time, according to the length of the period of time.

11. The radiation imaging apparatus of claim 9, wherein the control unit is configured to determine whether to perform the process based on a time passed since a previous readout has been finished.

12. The radiation imaging apparatus of claim 9, wherein each of the pixels further includes a clamp circuit arranged between the photoelectric conversion element and the sample hold circuit, including a capacitor element and the switch element.

13. The radiation imaging apparatus of claim 12, wherein each of the pixels further includes a source follower element arranged between the photoelectric conversion element and the clamp circuit.

14. The radiation imaging apparatus of claim 9, wherein the photoelectric conversion element includes a photodiode for generating the charge and a floating diffusion for accumulating the generated charge.

15. The radiation imaging apparatus of claim 9, wherein imaging is performed for obtaining an image including a multiple frames at a variable frame rate, and wherein the variable frame rate is controlled by the external signal.

16. The radiation imaging apparatus of claim 9, wherein the process is performed for fixing the indefinite potential in the sample hold circuit.

17. A method for controlling a radiation sensor for performing radiation imaging for obtaining an image including multiple frames, the radiation imaging sensor including pixels for obtaining signals corresponding to intensity of radiation detected by the pixels, each of the pixel including: a photoelectric conversion element for generating and accumulating a charge; a sample hold circuit coupled to the photoelectric conversion element for holding a signal corresponding to the accumulated charge at the photoelectric conversion element; and a switch element for connecting a voltage source and the sample hold circuit; and the radiation imaging sensor further including at least one signal line coupled to the sample hold circuit for outputting the held signal, the method comprising receiving an external signal indicating a timing of radiation generation;

controlling the radiation sensor to perform accumulation of a charge with the radiation sensor in response to a reception of the external signal, and to perform readout from the held signal from each of the pixels via the signal line; and performing a process to control the switch element on to store in the sample hold circuit a signal corresponding to the reference voltage repeatedly before the external signal has been received.

* * * * *